(12) United States Patent
Hwang

(10) Patent No.: US 12,542,165 B2
(45) Date of Patent: Feb. 3, 2026

(54) SEMICONDUCTOR SYSTEM

(71) Applicant: SK hynix Inc., Icheon-si (KR)

(72) Inventor: Kyu Dong Hwang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 162 days.

(21) Appl. No.: 18/458,670

(22) Filed: Aug. 30, 2023

(65) Prior Publication Data
US 2024/0127874 A1   Apr. 18, 2024

(30) Foreign Application Priority Data

Oct. 13, 2022 (KR) .................. 10-2022-0131850
Apr. 21, 2023 (KR) .................. 10-2023-0052997

(51) Int. Cl.
*G11C 7/22* (2006.01)
*G11C 7/10* (2006.01)

(52) U.S. Cl.
CPC ............ *G11C 7/222* (2013.01); *G11C 7/1084* (2013.01); *G11C 7/1093* (2013.01)

(58) Field of Classification Search
CPC .................................. G11C 7/22; G11C 7/222
USPC ..................................................... 365/189.16
See application file for complete search history.

(56) References Cited

U.S. PATENT DOCUMENTS

| | | | |
|---|---|---|---|
| 9,304,579 B2* | 4/2016 | Ware | G11C 11/4072 |
| 2017/0004869 A1* | 1/2017 | Shin | G11C 7/1045 |
| 2017/0243629 A1* | 8/2017 | Chen | H04L 25/0298 |
| 2020/0211618 A1* | 7/2020 | Kwak | G11C 7/1093 |
| 2020/0278802 A1* | 9/2020 | Suh | G06F 13/1689 |
| 2022/0027067 A1 | 1/2022 | Suh et al. | |
| 2022/0059145 A1* | 2/2022 | Kim | G11C 7/1045 |
| 2023/0223941 A1* | 7/2023 | Lee | G11C 11/4076 |

FOREIGN PATENT DOCUMENTS

KR         101247268 B1    3/2013

* cited by examiner

*Primary Examiner* — Muna A Techane
(74) *Attorney, Agent, or Firm* — WILLIAM PARK AND ASSOCIATES LTD.

(57) ABSTRACT

A semiconductor system includes a controller configured to output a command address, data, and a write clock and an inverted write clock for latching the data through a channel, configured to output the write clock and the inverted write clock having a first set level and a second set level, respectively, by incorporating information with regard to characteristics of the channel during a pre-level interval, and configured to output the write clock and the inverted write clock that periodically toggle during a toggle interval, and a semiconductor device configured to latch and store the data in synchronization with the write clock and the inverted write clock.

24 Claims, 12 Drawing Sheets

SEMICONDUCTOR SYSTEM

CROSS-REFERENCE TO RELATED APPLICATIONS

The present application claims priority under 35 U.S.C. § 119(a) to Korean Patent Application Nos. 10-2022-0131850 and 10-2023-0052997, filed in the Korean Intellectual Property Office on Oct. 13, 2022 and Apr. 21, 2023, respectively, the entire disclosures of which are incorporated herein by reference.

BACKGROUND

The present disclosure relates to a semiconductor system for latching and storing data in synchronization with a write clock.

Recently, as the operating speed of a semiconductor system is increased, a high-speed data transfer rate tends to be required between semiconductor devices that are included in the semiconductor system. In order to satisfy a high-speed data transfer rate or high bandwidth of data that are input and output in series between the semiconductor devices, new technologies are applied.

For example, in order to input and output data at a high speed, a clock dividing scheme is used. When a clock is divided, a multi-phase clock having different phases is generated. Data are input and output at a high speed by parallelizing or serializing the data based on the multi-phase clock.

SUMMARY

In an embodiment, a semiconductor system may include a controller configured to output a command address, data, and a write clock and an inverted write clock for latching the data through a channel, configured to output the write clock and the inverted write clock having a first set level and a second set level, respectively, by incorporating information with regard to characteristics of the channel during a pre-level interval, and configured to output the write clock and the inverted write clock that periodically toggle during a toggle interval, and a semiconductor device configured to latch and store the data in synchronization with the write clock and the inverted write clock.

In another embodiment, a semiconductor system may include a controller configured to output a command address, data, and a write clock and an inverted write clock for latching the data through a channel, configured to output the write clock having a first set level and the inverted write clock having a second set level in response to a code signal that is input through the channel during a pre-level interval, and configured to output the write clock and the inverted write clock that periodically toggle during a toggle interval, and a semiconductor device configured to output the code signal by detecting the write clock and the inverted write clock that are input during the toggle interval and configured to latch and store the data in synchronization with the write clock and the inverted write clock.

DETAILED DESCRIPTION

Figure 1:
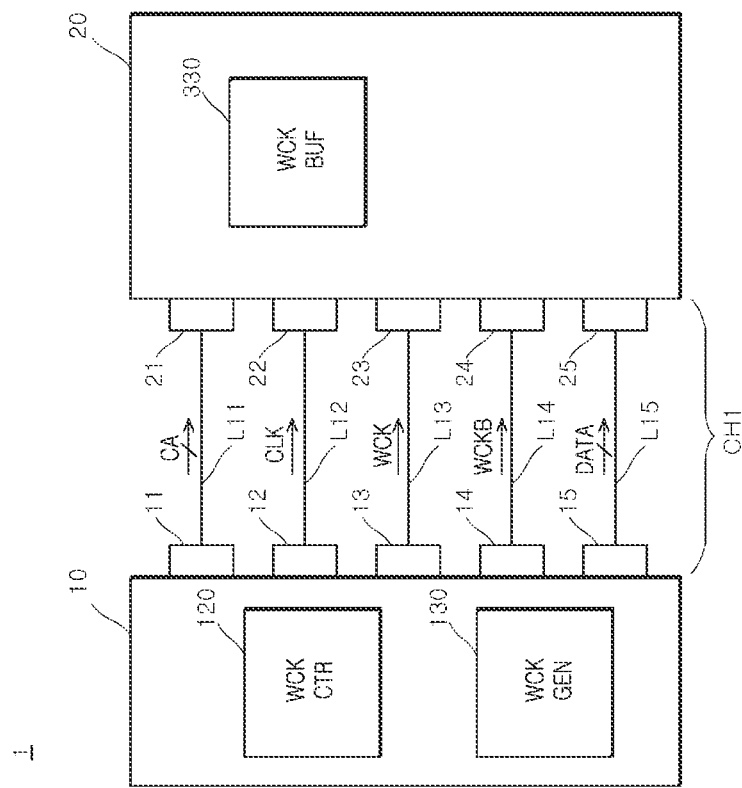
FIG. 1 is a block diagram illustrating a construction of a semiconductor system according to an embodiment of the present disclosure.

In the descriptions of the following embodiments, the term "preset" indicates that the numerical value of a parameter is previously decided, when the parameter is used in a process or algorithm. According to an embodiment, the numerical value of the parameter may be set when the process or algorithm is started or while the process or algorithm is performed.

Terms such as "first" and "second," which are used to distinguish among various components, are not limited by the components. For example, a first component may be referred to as a second component, and vice versa.

When one component is referred to as being "coupled" or "connected" to another component, it should be understood that the components may be directly coupled or connected to each other or coupled or connected to each other through another component interposed therebetween. In contrast, when one component is referred to as being "directly coupled" or "directly connected" to another component, it should be understood that the components are directly coupled or connected to each other without another component interposed therebetween.

A "logic high level" and a "logic low level" are used to describe the logic levels of signals. A signal having a "logic high level" is distinguished from a signal having a "logic low level." For example, when a signal having a first voltage corresponds to a signal having a "logic high level," a signal having a second voltage may correspond to a signal having a "logic low level." According to an embodiment, a "logic high level" may be set to a voltage higher than a "logic low level." According to an embodiment, the logic levels of signals may be set to different logic levels or opposite logic levels. For example, a signal having a logic high level may be set to have a logic low level in some embodiments, and a signal having a logic low level may be set to have a logic high level in some embodiments.

Hereafter, the present disclosure will be described in more detail through embodiments. The embodiments are only used to exemplify the present disclosure, and the scope of the present disclosure is not limited by the embodiments.

Embodiments of the present disclosure provide a semiconductor system for latching and storing data by generating a write clock having a set level during a pre-level interval and then generating a write clock that periodically toggles during a toggle interval.

According to the present disclosure, it is possible to reduce an inter-symbol interference (ISI) phenomenon of a channel by generating a write clock having a set level based on information with regard to the characteristics of the channel during a pre-level interval and then generating a write clock that periodically toggles during a toggle interval.

Furthermore, according to the present disclosure, it is possible to stably generate a write clock by generating the write clock having a set level based on information with regard to the characteristics of a channel during a pre-level interval and then generating the write clock that periodically toggles during a toggle interval.

Furthermore, according to the present disclosure, it is possible to perform a stable data input and output operation by inputting and outputting data in synchronization with a write clock that stably toggles after performing a pre-level adjustment operation.

As illustrated in FIG. 1, a semiconductor system 1 according to an embodiment of the present disclosure may include a controller 10 and a semiconductor device 20. The controller 10 and the semiconductor device 20 may be connected through a channel CH1.

The channel CH1 may include a first pad 11, a second pad 12, a third pad 13, a fourth pad 14, and a fifth pad 15 that are connected to the controller 10. The channel CH1 may include a sixth pad 21, a seventh pad 22, an eighth pad 23, a ninth pad 24, and a tenth pad 25 that are connected to the semiconductor device 20. The channel CH1 may include a first transmission line L11 that is connected between the first pad 11 and the sixth pad 21, a second transmission line L12 that is connected between the second pad 12 and the seventh pad 22, a third transmission line L13 that is connected between the third pad 13 and the eighth pad 23, a fourth transmission line L14 that is connected between the fourth pad 14 and the ninth pad 24, and a fifth transmission line L15 that is connected between the fifth pad 15 and the tenth pad 25.

The controller 10 may output a command address CA to the semiconductor device 20 through the first transmission line L11. The controller 10 may output a clock CLK to the semiconductor device 20 through the second transmission line L12. The controller 10 may output a write clock WCK to the semiconductor device 20 through the third transmission line L13. The controller 10 may output an inverted write clock WCKB to the semiconductor device 20 through the fourth transmission line L14. The controller 10 may output data DATA to the semiconductor device 20 through the fifth transmission line L15. The command address CA may be set as multiple bits including a command and address for controlling an operation of the semiconductor device 20.

The clock CLK may be set as a signal that periodically toggles in order to synchronize the controller 10 and the semiconductor device 20. The write clock WCK and the inverted write clock WCKB may each be set as a signal that periodically toggles in order to latch the data DATA. The data DATA may be set as common data including multiple bits.

The controller 10 may include a write clock control circuit (WCK CTR) 120 and a write clock generation circuit (WCK GEN) 130.

The write clock control circuit 120 may generate an enable signal (PREN in FIG. 2) that is generated during a pre-level interval. The write clock control circuit 120 may generate a pre-write clock (PWCK in FIG. 2) and a pre-inverted write clock (PWCKB in FIG. 2) during the pre-level interval and a toggle interval. The write clock control circuit 120 may generate first to fourth code signals (CODE<1:4> in FIG. 2) including information with regard to the characteristics of the channel CH1. The information with regard to the characteristics of the channel CH1 may include process, voltage, and temperature (PVT) variations and transmission speeds for the first to tenth pads 11 to 15 and 21 to 25 and the first to fifth transmission lines L11 to L15 that are included in the channel CH1. The transmission speed may mean the transmission speeds of signals that are input and output in the first to tenth pads 11 to 15 and 21 to 25 and the first to fifth transmission lines L11 to L15.

Figure 2:
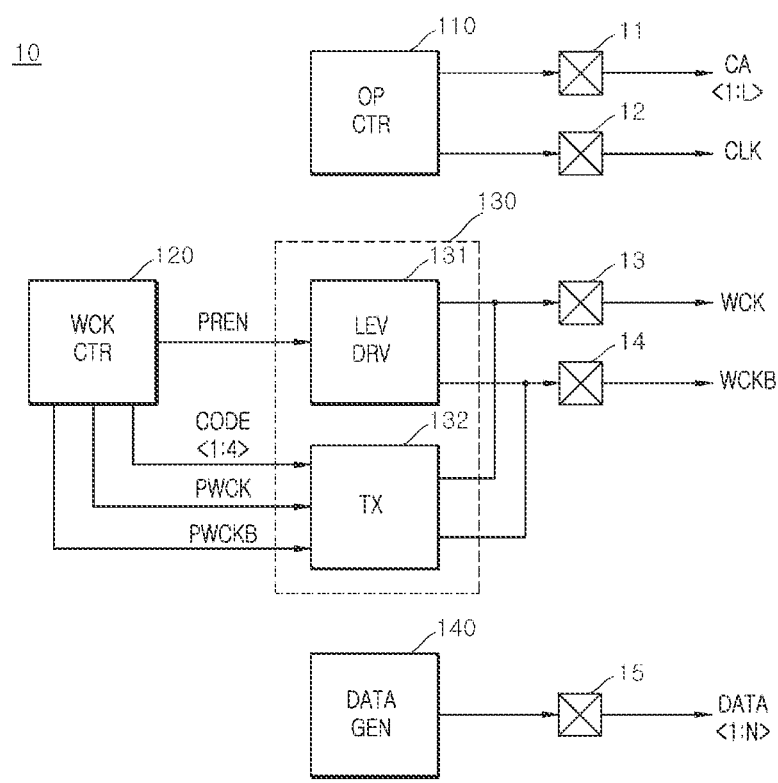
FIG. 2 is a block diagram illustrating a construction according to an embodiment of a controller that is included in the semiconductor system illustrated in FIG. 1.

During the pre-level interval, the write clock generation circuit 130 may output the write clock WCK having a first set level and the inverted write clock WCKB having a second set level through the channel CH1 in response to the enable signal (PREN in FIG. 2) and the first to fourth code signals (CODE<1:4> in FIG. 2). Through the channel CH1, the write clock generation circuit 130 may output the write clock WCK and the inverted write clock WCKB that periodically toggle during the toggle interval. The first set level may be set as a higher voltage level than the voltage level of a ground voltage (VSS in FIG. 3). The second set level may be set as a lower voltage level than the voltage level of a source voltage (VDD in FIG. 3). The write clock WCK and the inverted write clock WCKB may be generated to have opposite phases during the toggle interval.

During the pre-level interval, the controller 10 may output, to the semiconductor device 20, the write clock WCK having the first set level and the inverted write clock WCKB having the second set level in response to the first to fourth code signals (CODE<1:4> in FIG. 2) including information with regard to the characteristics of the channel CH1. During the toggle interval, the controller 30 may output the write clock WCK and the inverted write clock WCKB that periodically toggle, to the semiconductor device 20, in response to the first to fourth code signals (CODE<1:4> in FIG. 2) including the information with regard to the characteristics of the channel CH1.

The semiconductor device 20 may include a write clock buffer circuit (WCK BUF) 330.

The write clock buffer circuit 330 may receive the write clock WCK and the inverted write clock WCKB. The write clock buffer circuit 330 may transfer, to a circuit for latching the data DATA, the write clock WCK and the inverted write clock WCKB that are input during the toggle interval by buffering the write clock WCK and the inverted write clock WCKB.

The semiconductor device 20 may perform a write operation based on the command address CA that is input in synchronization with the clock CLK. During the toggle interval in the write operation, the semiconductor device 20 may latch the data DATA in synchronization with the write clock WCK and the inverted write clock WCKB. The semiconductor device 20 may store the data DATA that has been latched in the write operation.

FIG. 2 is a block diagram illustrating a construction according to an embodiment of the controller 10 that is included in the semiconductor system 1. The controller 10 may include an operation control circuit (OP CTR) 110, a write clock control circuit (WCK CTR) 120, a write clock generation circuit 130, and a data generation circuit (DATA GEN) 140.

The operation control circuit 110 may be connected to the first pad 11 and the second pad 12. The operation control circuit 110 may output first to L-th command addresses CA<1:L> for performing a write operation through the first pad 11. The operation control circuit 110 may output the clock CLK that periodically toggles through the second pad 12. The first to L-th command addresses CA<1:L> may include "L" bits. The number "L" of bits of the first to L-th command addresses CA<1:L> may be set as a positive integer.

During the pre-level interval, the write clock control circuit 120 may generate the enable signal PREN having a logic high level. During the pre-level interval, the write clock control circuit 120 may generate the pre-write clock PWCK having the voltage level of the ground voltage (VSS in FIG. 3) and the pre-inverted write clock PWCKB having the voltage level of the source voltage (VDD in FIG. 3). During the toggle interval, the write clock control circuit 120 may generate the pre-write clock PWCK and the pre-inverted write clock PWCKB that periodically toggle. During the toggle interval, the pre-write clock PWCK and the pre-inverted write clock PWCKB may toggle at a voltage level between the source voltage (VDD in FIG. 3) and the ground voltage (VSS in FIG. 3). The write clock control circuit 120 may generate the first to fourth code signals CODE<1:4> including information with regard to the characteristics of the channel CH1. The information with regard to the characteristics of the channel CH1 may include PVT variations and transmission speeds for the first to tenth pads 11 to 15 and 21 to 25 and the first to fifth transmission lines L11 to L15 that are included in the channel CH1.

The write clock generation circuit 130 may include a level driving circuit (LEV DRV) 131 and a transmission circuit (TX) 132.

The level driving circuit 131 may be connected to the third pad 13 and the fourth pad 14. The level driving circuit 131 may drive the third pad 13 in response to the enable signal PREN during the pre-level interval. The level driving circuit 131 may drive the fourth pad 14 in response to the enable signal PREN during the pre-level interval. The driving power of the level driving circuit 131 for driving the third pad 13 and the fourth pad 14 is specifically described with reference to FIG. 3.

The transmission circuit 132 may be connected to the third pad 13 and the fourth pad 14. During the pre-level interval, the transmission circuit 132 may drive the third pad 13 based on the pre-write clock PWCK, the pre-inverted write clock PWCKB, and the first to fourth code signals CODE<1:4>. During the pre-level interval, the transmission circuit 132 may drive the fourth pad 14 based on the pre-write clock PWCK, the pre-inverted write clock PWCKB, and the first to fourth code signals CODE<1:4>. During the toggle interval, the transmission circuit 132 may drive the third pad 13 based on the pre-write clock PWCK, the pre-inverted write clock PWCKB, and the first to fourth code signals CODE<1:4>. During the toggle interval, the transmission circuit 132 may drive the fourth pad 14 based on the pre-write clock PWCK, the pre-inverted write clock PWCKB, and the first to fourth code signals CODE<1:4>. The driving power of the transmission circuit 132 for driving the third pad 13 and the fourth pad 14 is specifically described with reference to FIG. 4.

The write clock generation circuit 130 may be connected to the third pad 13 and the fourth pad 14. During the pre-level interval, the write clock generation circuit 130 may output the write clock WCK having the first set level, through the third pad 13, based on the enable signal PREN, the pre-write clock PWCK, the pre-inverted write clock PWCKB, and the first to fourth code signals CODE<1:4>. During the pre-level interval, the write clock generation circuit 130 may output the inverted write clock WCKB having the second set level, through the fourth pad 14, based on the enable signal PREN, the pre-write clock PWCK, the pre-inverted write clock PWCKB, and the first to fourth code signals CODE<1:4>. During the toggle interval, the write clock generation circuit 130 may output the write clock WCK that periodically toggles, through the third pad 13, based on the pre-write clock PWCK, the pre-inverted write clock PWCKB, and the first to fourth code signals CODE<1:4>. During the toggle interval, the write clock generation circuit 130 may output the inverted write clock WCKB that periodically toggles, through the fourth pad 14, based on the pre-write clock PWCK, the pre-inverted write clock PWCKB, and the first to fourth code signals CODE<1:4>.

Figure 3:
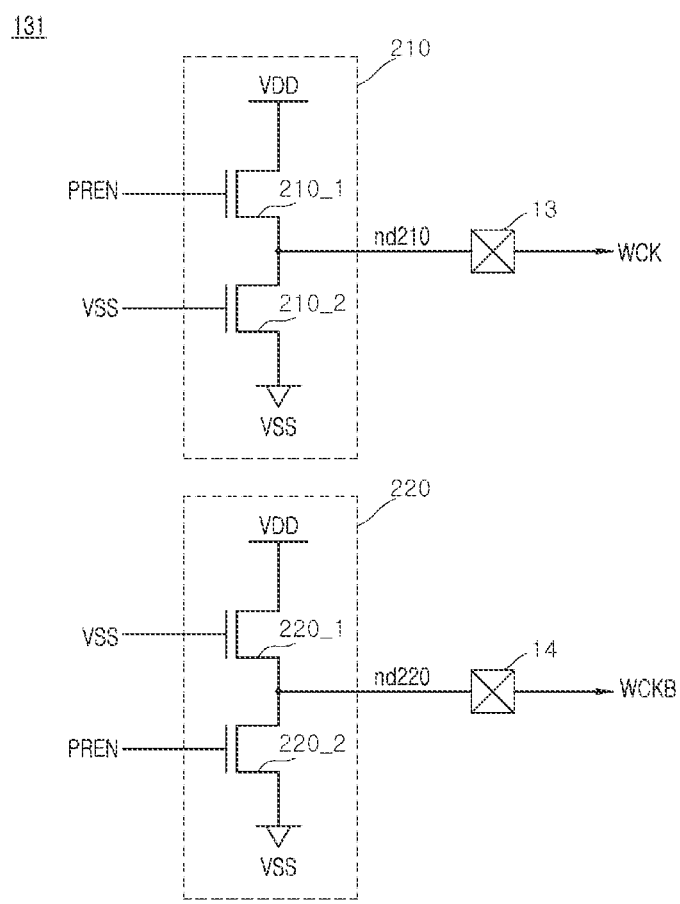
FIG. 3 is a circuit diagram illustrating a construction according to an embodiment of a level driving circuit that is included in a write clock generation circuit illustrated in FIG. 2.

FIG. 3 is a circuit diagram illustrating a construction according to an embodiment of the level driving circuit 131 that is included in the write clock generation circuit 130. The level driving circuit 131 may include a first driving circuit 210 and a second driving circuit 220.

The first driving circuit 210 may be connected to the third pad 13. The first driving circuit 210 may be implemented with an NMOS transistor 210_1 that is connected between the source voltage VDD and a node nd210 and an NMOS transistor 210_2 that is connected between the node nd210 and the ground voltage VSS. The node nd210 may be connected to the third pad 13. The NMOS transistor 210_1 may be turned on when the enable signal PREN having a logic high level is generated and may drive the third pad 13 with a first pull-up driving power to the node nd210 by receiving charges from the source voltage VDD. The NMOS transistor 210_2 may be turned off by the ground voltage VSS.

The second driving circuit 220 may be connected to the fourth pad 14. The second driving circuit 220 may be implemented with an NMOS transistor 220_1 that is connected between the source voltage VDD and a node nd220 and an NMOS transistor 220_2 that is connected between the node nd220 and the ground voltage VSS. The node nd220 may be connected to the fourth pad 14. The NMOS transistor 220_1 may be turned off by the ground voltage VSS. The NMOS transistor 220_2 may be turned on when the enable signal PREN having a logic high level is generated and may drive the fourth pad 14 with first pull-down driving power by discharging the charges of the node nd210 to the ground voltage VSS.

Figure 4:
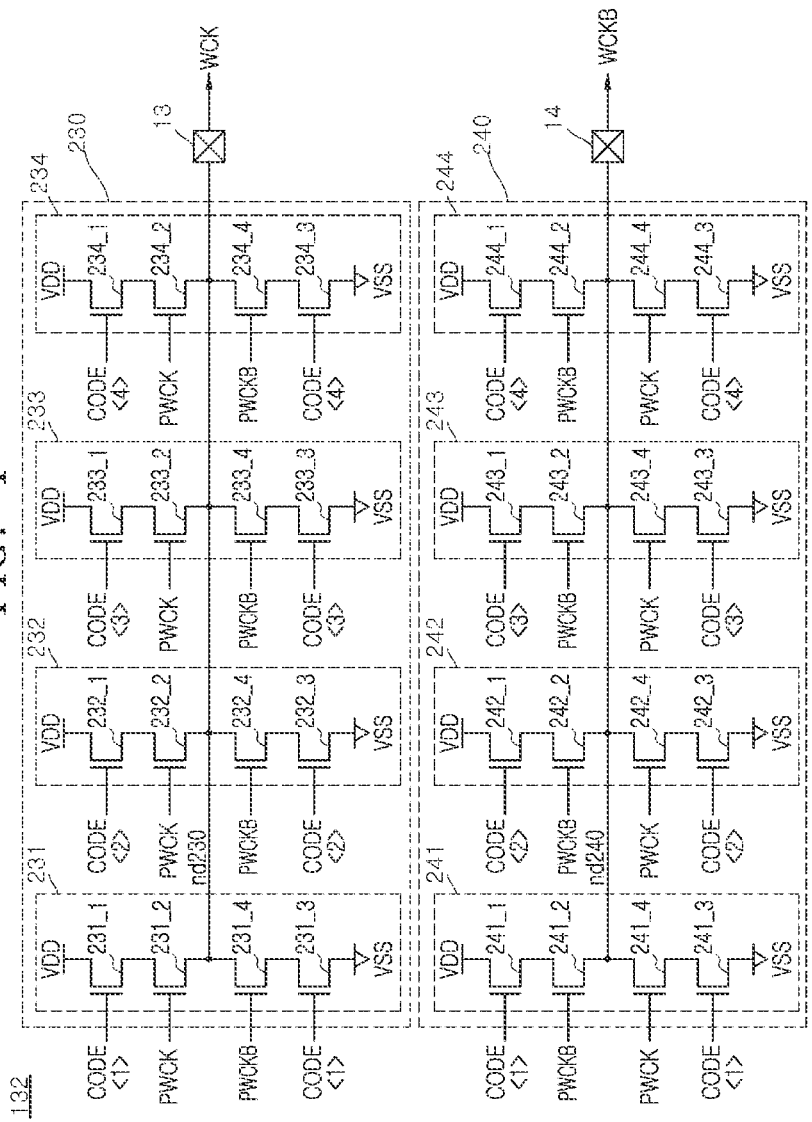
FIG. 4 is a circuit diagram illustrating a construction according to an embodiment of a transmission circuit that is included in the write clock generation circuit illustrated in FIG. 2.

FIG. 4 is a circuit diagram illustrating a construction according to an embodiment of the transmission circuit 132 that is included in the write clock generation circuit 130. The transmission circuit 132 may include a write clock driving circuit 230 and an inverted write clock driving circuit 240.

The write clock driving circuit 230 may be connected to the third pad 13. The write clock driving circuit 230 may include a first driver 231, a second driver 232, a third driver 233, and a fourth driver 234.

The first driver 231 may be implemented with an NMOS transistor 231_1 and an NMOS transistor 231_2 that are connected in series between the source voltage VDD and a node nd230 and an NMOS transistor 231_3 and an NMOS transistor 231_4 that are connected in series between the node nd230 and the ground voltage VSS. The node nd230 may be connected to the third pad 13. The NMOS transistor 231_1 may be turned on when the first code signal CODE<1> having a logic high level is generated. The NMOS transistor 231_2 may be turned on when the pre-write clock PWCK having a logic high level is generated. When the NMOS transistor 231_1 and the NMOS transistor 231_2 are turned on, the first driver 231 may drive the third pad 13 with a second pull-up driving power to the node nd230 by receiving charges from the source voltage VDD. The NMOS transistor 231_3 may be turned on when the first code signal CODE<1> having a logic high level is generated. The NMOS transistor 231_4 may be turned on when the inverted pre-write clock PWCKB having a logic high level is generated. When the NMOS transistor 231_3 and the NMOS transistor 231_4 are turned on, the first driver 231 may drive the third pad 13 with the second pull-down driving power by discharging the charges of the node nd230 to the ground voltage VSS.

The second driver 232 may be implemented with an NMOS transistor 232_1 and an NMOS transistor 232_2 that are connected in series between the source voltage VDD and the node nd230 and an NMOS transistor 232_3 and an NMOS transistor 232_4 that are connected in series between the node nd230 and the ground voltage VSS. The NMOS transistor 232_1 may be turned on when the second code signal CODE<2> having a logic high level is generated. The NMOS transistor 232_2 may be turned on when the pre-write clock PWCK having a logic high level is generated. When being turned on, the NMOS transistor 232_1 and the NMOS transistor 232_2 may drive the third pad 13 with a third pull-up driving power to the node nd230 by receiving charges from the source voltage VDD. The NMOS transistor 232_3 may be turned on when the second code signal CODE<2> having a logic high level is generated. The NMOS transistor 232_4 may be turned on when the inverted pre-write clock PWCKB having a logic high level is generated. When being turned on, the NMOS transistor 232_3 and the NMOS transistor 232_4 may drive the third pad 13 with the third pull-down driving power by discharging the charges of the node nd230 to the ground voltage VSS.

The third driver 233 may be implemented with an NMOS transistor 233_1 and an NMOS transistor 233_2 that are connected in series between the source voltage VDD and the node nd230 and an NMOS transistor 233_3 and an NMOS transistor 233_4 that are connected in series between the node nd230 and the ground voltage VSS. The NMOS transistor 233_1 may be turned on when the third code signal CODE<3> having a logic high level is generated. The NMOS transistor 233_2 may be turned on when the pre-write clock PWCK having a logic high level is generated. When being turned on, the NMOS transistor 233_1 and the NMOS transistor 233_2 may drive the third pad 13 with a fourth pull-up driving power to the node nd230 by receiving charges from the source voltage VDD. The NMOS transistor 233_3 may be turned on when the third code signal CODE<3> having a logic high level is generated. The NMOS transistor 233_4 may be turned on when the inverted pre-write clock PWCKB having a logic high level is generated. When being turned on, the NMOS transistor 233_3 and the NMOS transistor 233_4 may drive the third pad 13 with the fourth pull-down driving power by discharging the charges of the node nd230 to the ground voltage VSS.

The fourth driver 234 may be implemented with an NMOS transistor 234_1 and an NMOS transistor 234_2 that are connected in series between the source voltage VDD and the node nd230 and an NMOS transistor 234_3 and an NMOS transistor 234_4 that are connected in series between the node nd230 and the ground voltage VSS. The NMOS transistor 234_1 may be turned on when the fourth code signal CODE<4> having a logic high level is generated. The NMOS transistor 234_2 may be turned on when the pre-write clock PWCK having a logic high level is generated. When being turned on, the NMOS transistor 234_1 and the NMOS transistor 234_2 may drive the third pad 13 with a fifth pull-up driving power to the node nd230 by receiving charges from the source voltage VDD. The NMOS transistor 234_3 may be turned on when the fourth code signal CODE<4> having a logic high level is generated. The NMOS transistor 234_4 may be turned on when the inverted pre-write clock PWCKB having a logic high level is generated. When being turned on, the NMOS transistor 234_3 and the NMOS transistor 234_4 may drive the third pad 13 with the fifth pull-down driving power by discharging the charges of the node nd230 to the ground voltage VSS.

The inverted write clock driving circuit 240 may be connected to the fourth pad 14. The inverted write clock driving circuit 240 may include a fifth driver 241, a sixth driver 242, a seventh driver 243, and an eighth driver 244.

The fifth driver 241 may be implemented with an NMOS transistor 241_1 and an NMOS transistor 241_2 that are connected in series between the source voltage VDD and a node nd240 and an NMOS transistor 241_3 and an NMOS transistor 241_4 that are connected in series between the node nd240 and the ground voltage VSS. The node nd240 may be connected to the fourth pad 14. The NMOS transistor 241_1 may be turned on when the first code signal CODE<1> having a logic high level is generated. The NMOS transistor 241_2 may be turned on when the inverted pre-write clock PWCKB having a logic high level is generated. When being turned on, the NMOS transistor 241_1 and the NMOS transistor 241_2 may drive the fourth pad 14 with a sixth pull-up driving power to the node nd240 by receiving charges from the source voltage VDD. The NMOS transistor 241_3 may be turned on when the first code signal CODE<1> having a logic high level is generated. The NMOS transistor 241_4 may be turned on when the pre-write clock PWCK having a logic high level is generated. When being turned on, the NMOS transistor 241_3 and the NMOS transistor 241_4 may drive the fourth pad 14 with the sixth pull-down driving power by discharging the charges of the node nd240 to the ground voltage VSS.

The sixth driver 242 may be implemented with an NMOS transistor 242_1 and an NMOS transistor 242_2 that are connected in series between the source voltage VDD and the node nd240 and an NMOS transistor 242_3 and an NMOS transistor 242_4 that are connected in series between the node nd240 and the ground voltage VSS. The NMOS transistor 242_1 may be turned on when the second code signal CODE<2> having a logic high level is generated. The NMOS transistor 242_2 may be turned on when the inverted pre-write clock PWCKB having a logic high level is generated. When being turned on, the NMOS transistor 242_1 and the NMOS transistor 242_2 may drive the fourth pad 14 with a seventh pull-up driving power to the node nd240 by receiving charges from the source voltage VDD. The NMOS transistor 242_3 may be turned on when the second code signal CODE<2> having a logic high level is generated. The NMOS transistor 242_4 may be turned on when the pre-write clock PWCK having a logic high level is generated. When being turned on, the NMOS transistor 242_3 and the NMOS transistor 242_4 may drive the fourth pad 14 with the seventh pull-down driving power by discharging the charges of the node nd240 to the ground voltage VSS.

The seventh driver 243 may be implemented with an NMOS transistor 243_1 and an NMOS transistor 243_2 that are connected in series between the source voltage VDD and the node nd240 and an NMOS transistor 243_3 and an NMOS transistor 243_4 that are connected in series between the node nd240 and the ground voltage VSS. The NMOS transistor 243_1 may be turned on when the third code signal CODE<3> having a logic high level is generated. The NMOS transistor 243_2 may be turned on when the inverted pre-write clock PWCKB having a logic high level is generated. When being turned on, the NMOS transistor 243_1 and the NMOS transistor 243_2 may drive the fourth pad 14 with an eighth pull-up driving power to the node nd240 by receiving charges from the source voltage VDD. The NMOS transistor 243_3 may be turned on when the third code signal CODE<3> having a logic high level is generated. The NMOS transistor 243_4 may be turned on when the pre-write clock PWCK having a logic high level is generated. When being turned on, the NMOS transistor 243_3 and the NMOS transistor 243_4 may drive the fourth pad 14 with the eighth pull-down driving power by discharging the charges of the node nd240 to the ground voltage VSS.

The eighth driver 244 may be implemented with an NMOS transistor 244_1 and an NMOS transistor 244_2 that are connected in series between the source voltage VDD and the node nd240 and an NMOS transistor 244_3 and an NMOS transistor 244_4 that are connected in series between the node nd240 and the ground voltage VSS. The NMOS transistor 244_1 may be turned on when the fourth code signal CODE<4> having a logic high level is generated. The NMOS transistor 244_2 may be turned on when the inverted pre-write clock PWCKB having a logic high level is generated. When being turned on, the NMOS transistor 244_1 and the NMOS transistor 244_2 may drive the fourth pad 14 with a ninth pull-up driving power to the node nd240 by receiving charges from the source voltage VDD. The NMOS transistor 244_3 may be turned on when the fourth code signal CODE<4> having a logic high level is generated. The NMOS transistor 244_4 may be turned on when the pre-write clock PWCK having a logic high level is generated. When being turned on, the NMOS transistor 244_3 and the NMOS transistor 244_4 may drive the fourth pad 14 with the ninth pull-down driving power by discharging the charges of the node nd240 to the ground voltage VSS.

The level driving circuit 131 and the transmission circuit 132, illustrated in FIGS. 3 and 4, have been implemented as separate circuits. However, in another embodiment of the present disclosure, the level driving circuit 131 may be implemented to be included in the transmission circuit 132. For example, the level driving circuit 131 may be implemented so that, when the NMOS transistors that are included in the first to fourth drivers 231 to 234 and that are connected in series between the node nd230 and the ground voltage VSS drive the third pad 13 with a pull-down driving power, any one of the NMOS transistors that are connected in series between the source voltage VDD and the node nd230 may be turned on to drive the third pad 13 with a pull-up driving power. Furthermore, the level driving circuit 131 may be implemented so that, when the NMOS transistors that are included in the fifth to eighth drivers 241 to 244 and that are connected in series between the source voltage VDD and the node nd240 drive the fourth pad 14 with the pull-up driving power, any one of the NMOS transistors that are connected in series between the node nd240 and the ground voltage VSS may be turned on to drive the fourth pad 14 with the pull-down driving power.

Figure 5:
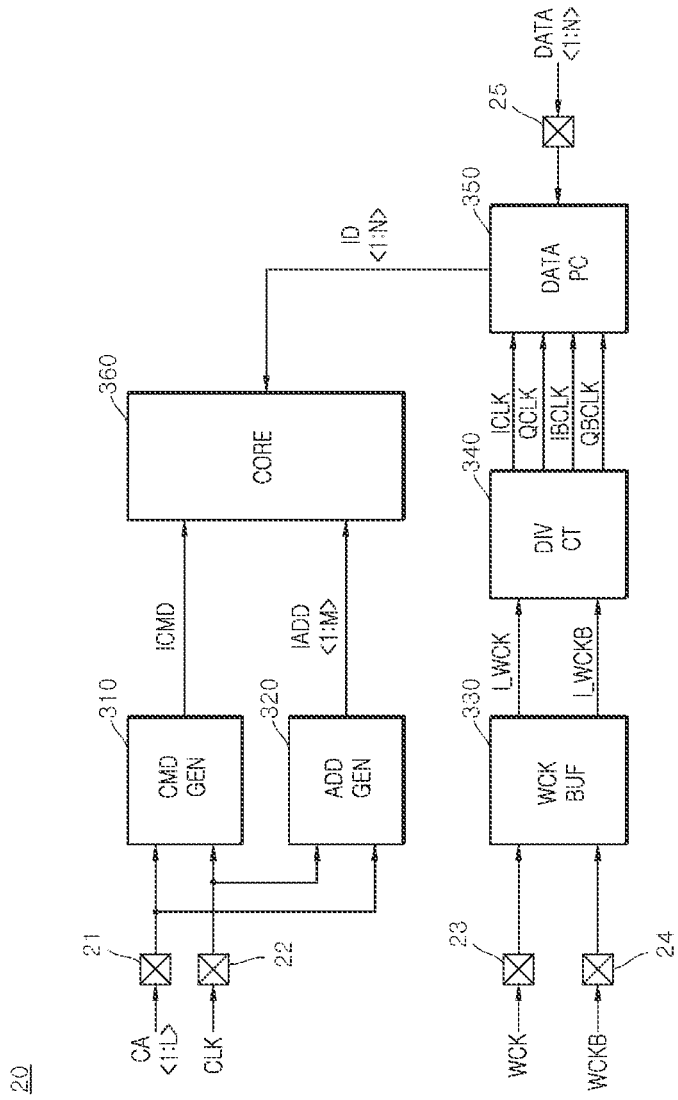
FIG. 5 is a block diagram illustrating a construction according to an embodiment of a semiconductor device that is included in the semiconductor system illustrated in FIG. 1.

FIG. 5 is a block diagram illustrating a construction according to an embodiment of the semiconductor device 20 that is included in the semiconductor system 1. The semiconductor device 20 may include a command generation circuit (CMD GEN) 310, an address generation circuit (ADD GEN) 320, a write clock buffer circuit (WCK BUF) 330, a frequency division circuit (DIV CT) 340, a data processing circuit (DATA PC) 350, and a core circuit (CORE) 360.

The command generation circuit 310 may be connected to the sixth pad 21 and the seventh pad 22. The command generation circuit 310 may generate an internal command ICMD based on first to L-th command addresses CA<1:L> that are input through the sixth pad 21 in synchronization with the clock CLK that is input through the seventh pad 22. The command generation circuit 310 may generate the internal command ICMD when the first to L-th command addresses CA<1:L> that are input in synchronization with the clock CLK have a logic level combination for performing a write operation. The command generation circuit 310 has been implemented to generate the internal command ICMD for performing a write operation but may be implemented to generate multiple internal commands for performing various operations according to embodiments.

The address generation circuit 320 may be connected to the sixth pad 21 and the seventh pad 22. The address generation circuit 320 may generate first to M-th internal addresses IADD<1:M> based on the first to L-th command addresses CA<1:L> that are input through the sixth pad 21 in synchronization with the clock CLK that is input through the seventh pad 22. The address generation circuit 320 may generate the first to M-th internal addresses IADD<1:M> that are selectively enabled by decoding the first to L-th command addresses CA<1:L> that are input in synchronization with the clock CLK. The first to M-th internal addresses IADD<1:M> may include "M" bits. The number "M" may be set as a positive integer.

The write clock buffer circuit 330 may be connected to the eighth pad 23 and the ninth pad 24. During the toggle interval, the write clock buffer circuit 330 may generate an input write clock I_WCK by buffering the write clock WCK that is input through the eighth pad 23. During the toggle interval, the write clock buffer circuit 330 may generate an inverted input write clock I_WCKB by buffering the inverted write clock WCKB that is input through the ninth pad 24.

The frequency division circuit 340 may generate a first internal clock ICLK, a second internal clock QCLK, a third internal clock IBCLK, and a fourth internal clock QBCLK by dividing the frequencies of the input write clock I_WCK and the inverted input write clock I_WCKB. The frequency division circuit 340 may generate the first internal clock ICLK, the second internal clock QCLK, the third internal clock IBCLK, and the fourth internal clock QBCLK that each have a frequency that is half (½) the frequency of each of the input write clock I_WCK and the inverted input write clock I_WCKB and that are sequentially generated. The first internal clock ICLK, the second internal clock QCLK, the third internal clock IBCLK, and the fourth internal clock QBCLK may be generated to have different phases.

The data processing circuit 350 may be connected to the tenth pad 25. The data processing circuit 350 may generate first to N-th internal data ID<1:N> based on first to N-th data DATA<1:N> that are input through the tenth pad 25 in synchronization with the first internal clock ICLK, the second internal clock QCLK, the third internal clock IBCLK, and the fourth internal clock QBCLK. The data processing circuit 350 may generate, in parallel, the first to N-th internal data ID<1:N> by latching and arranging the bits of the first to N-th data DATA<1:N> that are input in series in synchronization with the first internal clock ICLK, the second internal clock QCLK, the third internal clock IBCLK, and the fourth internal clock QBCLK. For example, the data processing circuit 350 may latch the first data DATA<1> that is input at a rising edge of the first internal clock ICLK, latch the second data DATA<2> that is input at a rising edge of the second internal clock QCLK, latch the third data DATA<3> that is input at a rising edge of the third internal clock IBCLK, and latch the fourth data DATA<4> that is input at a rising edge of the fourth internal clock QBCLK. The data processing circuit 350 may generate, in parallel, the first to fourth internal data ID<1:4> at the same time by arranging the first to fourth data DATA<1:4> that have been latched.

The core circuit 360 may be implemented as a common memory circuit including multiple memory cells (not illustrated). The core circuit 360 may store the first to N-th internal data ID<1:N> in a memory cell (not illustrated) that is selected, among the multiple memory cells (not illustrated), based on the internal command ICMD and the first to M-th internal addresses IADD<1:M>. The core circuit 360 has been implemented to perform a write operation but may be implemented to perform an active operation, a read operation, a precharge operation, or a refresh operation according to embodiments.

Figure 6:
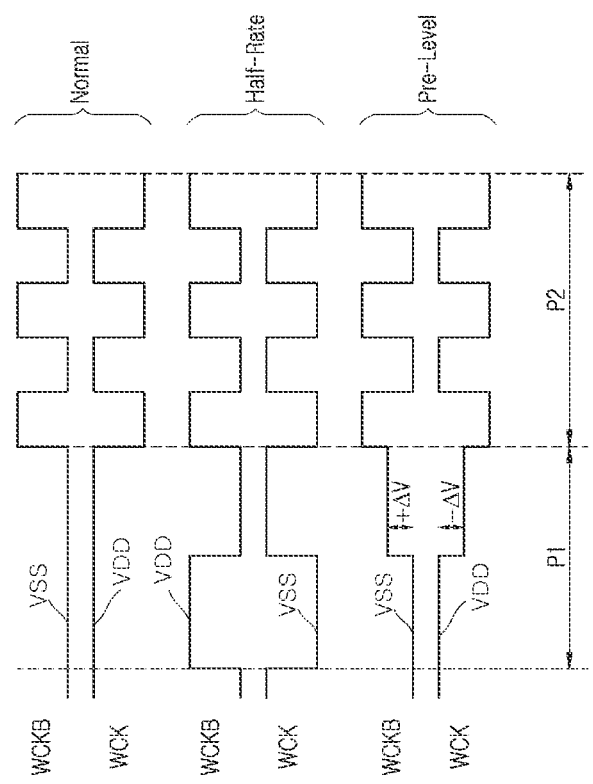
FIG. 6 is a diagram for describing an operation for generating a write clock and an inverted write clock in the semiconductor system according to various embodiments.

An operation of generating, by a semiconductor system according to various embodiments, a write clock and an inverted write clock is described as follows with reference to FIG. 6.

First, a normal operation (Normal) of generating, by the semiconductor system, the write clock WCK and the inverted write clock WCKB is described as follows.

In a first interval P1, the controller of the semiconductor system may output the write clock WCK by fixing the voltage level of the write clock WCK to the voltage level of the source voltage VDD and may output the inverted write clock WCKB by fixing the voltage level of the inverted write clock WCKB to the voltage level of the ground voltage VSS. The first interval P1 may be set as an interval before data for performing a write operation are output by the controller.

In a second interval P2, the controller of the semiconductor system may output the write clock WCK and the inverted write clock WCKB that periodically toggle between the voltage level of the source voltage VDD and the voltage level of the ground voltage VSS. In the second interval P2, in synchronization with the write clock WCK and the inverted write clock WCKB that periodically toggle, a semiconductor device of the semiconductor system may latch, arrange, and store the data that are output by the controller. The second interval P2 may be set as a write operation interval in which the data output by the controller are stored.

When the semiconductor system performs the normal operation of generating the write clock, a fail may occur when latching the data because an inter-symbol interference (ISI) phenomenon may occur in a channel due to the reflection and distortion of the channel at the start point of the second interval P2.

A frequency adjustment operation (Half-Rate) of generating, by the semiconductor system, the write clock WCK and the inverted write clock WCKB is described as follows.

In the first interval P1, the controller of the semiconductor system may output the write clock WCK and the inverted write clock WCKB, each having a frequency that is ½ (half rate) of a frequency in which each of the write clock WCK and the inverted write clock WCKB toggles during the second interval P2. The first interval P1 may be set as an interval before data for performing a write operation is output by the controller.

In the second interval P2, the controller of the semiconductor system may output the write clock WCK and the inverted write clock WCKB that periodically toggle between the voltage level of the source voltage VDD and the voltage level of the ground voltage VSS. In the second interval P2, the semiconductor device of the semiconductor system may latch, arrange, and store the data that are output by the controller in synchronization with the write clock WCK and the inverted write clock WCKB that periodically toggle. The second interval P2 may be set as a write operation interval in which the data output by the controller are stored.

When the semiconductor system performs the frequency adjustment operation (Half-Rate) that generates the write clock WCK and the inverted write clock WCKB, the ISI phenomenon of a channel may be decreased compared to the normal operation (Normal), but a fail may occur when latching the data because the ISI phenomenon still occurs in the channel due to the reflection and distortion of the channel at the start point of the second interval P2.

According to an embodiment of the present disclosure, a pre-level adjustment operation (Pre-Level) of generating, by the semiconductor system 1, the write clock WCK and the inverted write clock WCKB is described as follows.

In the first interval P1, by incorporating the characteristics of the channel, the controller of the semiconductor system may generate and output the write clock WCK having a voltage level that is set at a first level that is higher than the voltage level of the ground voltage VSS by Δ (+Δ) and may generate and output the inverted write clock WCKB having a voltage level that is set at a second level that is lower than the voltage level of the source voltage VDD by Δ (−Δ). The first interval P1 may be set as an interval before data for performing a write operation is output by the controller. In the first interval P1, the interval in which the write clock WCK having the first set level and the inverted write clock WCKB having the second set level are generated may be set as the pre-level interval. In this case, the voltage level of the first set level of the write clock WCK and the voltage level of the second set level of the inverted write clock WCKB may be set to have various voltage levels according to embodiments. Furthermore, the voltage level that becomes higher (+Δ) and the voltage level that becomes lower (−Δ) may have different voltage levels. For example, when the voltage level that becomes higher (+Δ) is +20 mV, the voltage level that becomes lower (−Δ) may be −10 mV.

In the pre-level adjustment operation (Pre-Level), the controller of the semiconductor system has been implemented to generate and output the write clock WCK having the voltage level of the first set level that is higher than the voltage level of the ground voltage VSS (+Δ) and to generate and output the inverted write clock WCKB having the voltage level of the second set level that is lower than the voltage level of the source voltage VDD (−Δ). However, according to embodiments, the controller of the semiconductor system may be implemented to generate and output the write clock WCK having the voltage level of the first set level that is lower than the voltage level of the source voltage VDD (−Δ) and to generate and output the inverted write clock WCKB having the voltage level of the second set level that is higher than the voltage level of the ground voltage VSS (+Δ). Furthermore, in the pre-level adjustment operation (Pre-Level), the controller of the semiconductor system may be implemented to generate the write clock WCK having the voltage level of the first set level that is close to the voltage level of the ground voltage VSS and to generate the inverted write clock WCKB having the voltage level of the second set level that is close to the voltage level of the source voltage VDD.

In the second interval P2, the controller of the semiconductor system may output the write clock WCK and the inverted write clock WCKB that periodically toggle between the voltage level of the source voltage VDD and the voltage level of the ground voltage VSS. In the second interval P2, the semiconductor device of the semiconductor system may latch, arrange, and store the data that are output by the controller in synchronization with the write clock WCK and the inverted write clock WCKB that periodically toggle. The second interval P2 may be set as a write operation interval in which the data output by the controller are stored. The second interval P2 may be set as the toggle interval in which the write clock WCK and the inverted write clock WCKB periodically toggle.

When the semiconductor system 1 performs the pre-level adjustment operation (Pre-Level) of generating the write clock, the ISI phenomenon of the channel can be reduced because the reflection and distortion of the channel at the start point of the second interval P2 is prevented.

The semiconductor system 1, according to an embodiment of the present disclosure, has been implemented to perform the pre-level adjustment operation (Pre-Level) on the write clock WCK but may be implemented to perform the pre-level adjustment operation (Pre-Level) on the clock signal CLK for synchronizing the controller 10 and the semiconductor device 20 according to embodiments.

The semiconductor system 1, according to an embodiment of the present disclosure, can reduce the ISI phenomenon of a channel and can stably generate the write clock WCK and the inverted write clock WCKB by generating the write clock WCK and the inverted write clock WCKB, each having a set level based on information with regard to the characteristics of the channel during the pre-level interval and then generating the write clock WCK and the inverted write clock WCKB that periodically toggle during the toggle interval. After performing the pre-level adjustment operation (Pre-Level), the semiconductor system 1 can perform a stable data input and output operation by inputting and outputting the data DATA in synchronization with the write clock WCK and the inverted write clock WCKB that stably toggle.

Figure 7:
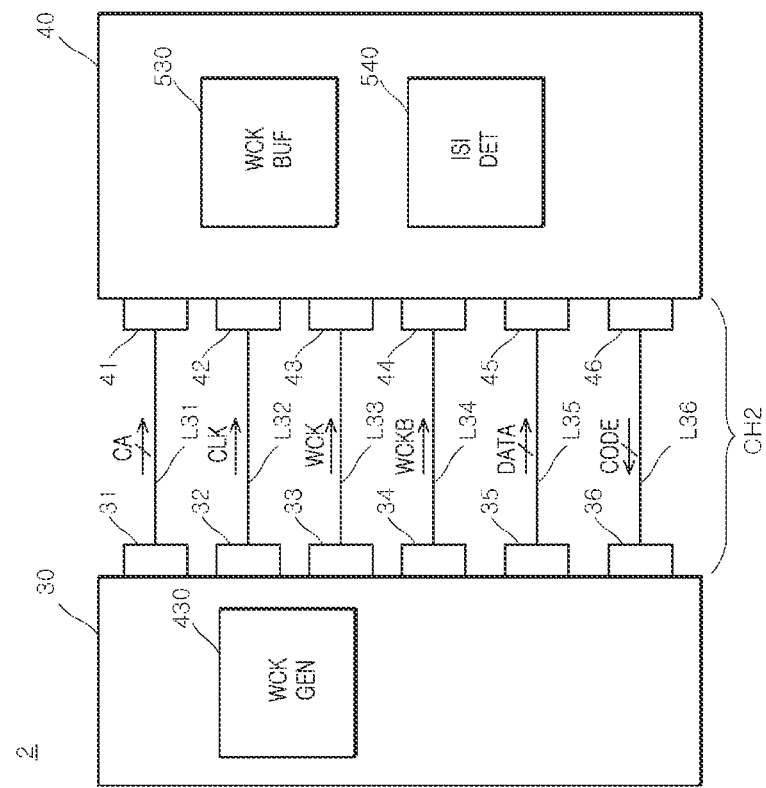
FIG. 7 is a block diagram illustrating a construction of a semiconductor system according to another embodiment of the present disclosure.

FIG. 7 is a block diagram illustrating a construction of a semiconductor system 2 according to another embodiment of the present disclosure. As illustrated in FIG. 7, the semiconductor system 2 according to another embodiment of the present disclosure may include a controller 30 and a semiconductor device 40. The controller 30 and the semiconductor device 40 may be connected through a channel CH2.

The channel CH2 may include a first pad 31, a second pad 32, a third pad 33, a fourth pad 34, a fifth pad 35, and a sixth pad 36 that are connected to the controller 30. The channel CH2 may include a seventh pad 41, an eighth pad 42, a ninth pad 43, a tenth pad 44, an eleventh pad 45, and a twelfth pad 46 that are connected to the semiconductor device 40. The channel CH2 may include a first transmission line L31 that is connected between the first pad 31 and the seventh pad 41, a second transmission line L32 that is connected between the second pad 32 and the eighth pad 42, a third transmission line L33 that is connected between the third pad 33 and the ninth pad 43, a fourth transmission line L34 that is connected between the fourth pad 34 and the tenth pad 44, a fifth transmission line L35 that is connected between the fifth pad 35 and the eleventh pad 45, and a sixth transmission line L36 that is connected between the sixth pad 36 and the twelfth pad 46.

The controller 30 may output a command address CA to the semiconductor device 40 through the first transmission line L31. The controller 30 may output a clock CLK to the semiconductor device 40 through the second transmission line L32. The controller 30 may output a write clock WCK to the semiconductor device 40 through the third transmission line L33. The controller 30 may output an inverted write clock WCKB to the semiconductor device 40 through the fourth transmission line L34. The controller 30 may output data DATA to the semiconductor device 40 through the fifth transmission line L35. The controller 30 may receive a code signal CODE from the semiconductor device 40 through the sixth transmission line L36.

The command address CA may be set as multiple bits including a command and an address for controlling an operation of the semiconductor device 40. The clock CLK may be set as a signal that periodically toggles in order to synchronize the controller 30 and the semiconductor device 40. The write clock WCK and the inverted write clock WCKB may each be set as a signal that periodically toggles in order to latch the data DATA. The data DATA may be set as common data including multiple bits. The code signal CODE may be set as a signal including information with regard to the characteristics of the channel CH2 by detecting the number of toggles of each of the write clock WCK and the inverted write clock WCKB.

The controller 30 may include a write clock generation circuit (WCK GEN) 430.

During a pre-level interval, the write clock generation circuit 430 may output the write clock WCK having a first set level and the inverted write clock WCKB having a second set level through the channel CH2 in response to an enable signal (PREN in FIG. 8) and the code signal CODE. Through the channel CH2 during a toggle interval, the write clock generation circuit 430 may output the write clock WCK and the inverted write clock WCKB that periodically toggle. The first set level may be set as a higher voltage level than the voltage level of the ground voltage (VSS in FIG. 3). The second set level may be set as a lower voltage level than the voltage level of the source voltage (VDD in FIG. 3). The write clock WCK and the inverted write clock WCKB may be generated to have opposite phases during the toggle interval.

During the pre-level interval, the controller 30 may output, to the semiconductor device 40, the write clock WCK having the first set level and the inverted write clock WCKB having the second set level in response to the code signal CODE including information with regard to the characteristics of the channel CH2. During the toggle interval, the controller 30 may output, to the semiconductor device 40, the write clock WCK and the inverted write clock WCKB that periodically toggle in response to the code signal CODE including information with regard to the characteristics of the channel CH2.

The semiconductor device 40 may include a write clock buffer circuit (WCK BUF) 530 and a detection circuit (ISI DET) 540.

The write clock buffer circuit 530 may receive the write clock WCK and the inverted write clock WCKB. The write clock buffer circuit 530 may transfer, to a circuit for latching the data DATA, the write clock WCK and the inverted write clock WCKB that are input during the toggle interval by buffering the write clock WCK and the inverted write clock WCKB.

The detection circuit 540 may generate the code signal CODE by detecting the number of toggles of each of the write clock WCK and the inverted write clock WCKB that are input during the toggle interval and may output the code signal CODE through the channel CH2.

The semiconductor device 40 may perform a write operation based on the command address CA that is input in synchronization with the clock CLK. During the toggle interval in the write operation, the semiconductor device 40 may latch the data DATA in synchronization with the write clock WCK and the inverted write clock WCKB. The semiconductor device 40 may store the data DATA that have been latched in the write operation. The semiconductor device 40 may output, to the controller 30, the code signal CODE including information with regard to the characteristics of the channel CH2 by detecting the number of toggles of each of the write clock WCK and the inverted write clock WCKB that have been input during the toggle interval.

Figure 8:
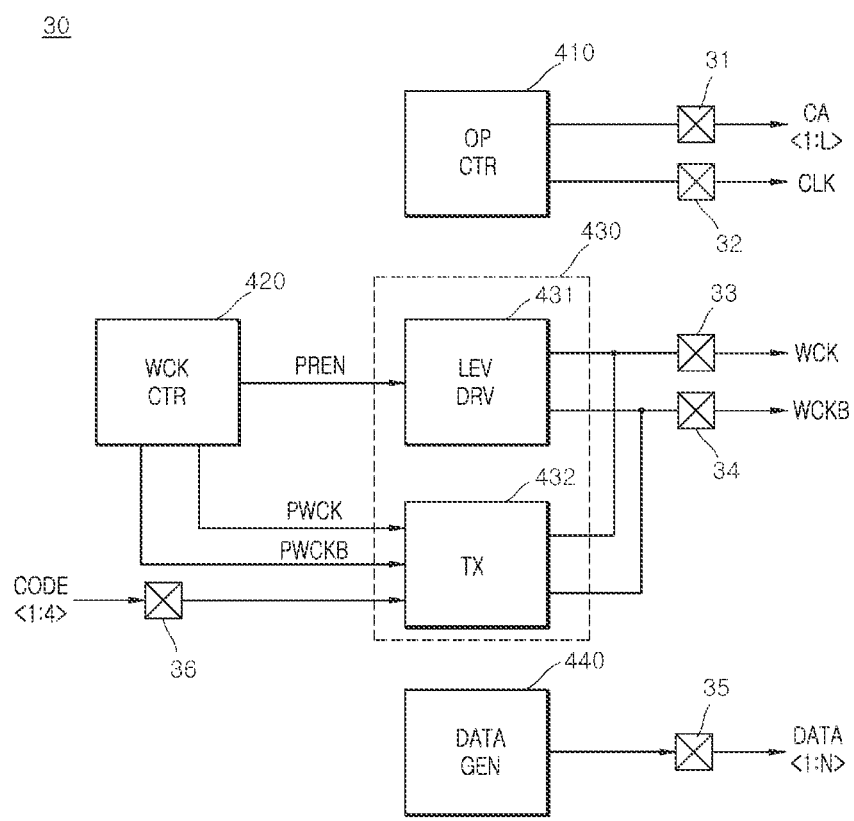
FIG. 8 is a block diagram illustrating a construction according to an embodiment of a controller that is included in the semiconductor system illustrated in FIG. 7.

FIG. 8 is a block diagram illustrating a construction according to an embodiment of the controller 30 that is included in the semiconductor system 2. The controller 30 may include an operation control circuit (OP CTR) 410, a write clock control circuit (WCK CTR) 420, a write clock generation circuit 430, and a data generation circuit (DATA GEN) 440.

The operation control circuit 410 may be connected to the first pad 31 and the second pad 32. The operation control circuit 410 may output first to L-th command addresses CA<1:L> for performing a write operation through the first pad 31. The operation control circuit 410 may output the clock CLK that periodically toggles through the second pad 32. The first to L-th command addresses CA<1:L> may include "L" bits. The number "L" of bits of the first to L-th command addresses CA<1:L> may be set as a positive integer.

During the pre-level interval, the write clock control circuit 420 may generate the enable signal PREN having a logic high level. During the pre-level interval, the write clock control circuit 420 may generate a pre-write clock PWCK having the voltage level of the ground voltage (VSS in FIG. 3) and a pre-inverted write clock PWCKB having the voltage level of the source voltage (VDD in FIG. 3). During the toggle interval, the write clock control circuit 420 may generate the pre-write clock PWCK and the pre-inverted write clock PWCKB that periodically toggle. During the toggle interval, the pre-write clock PWCK and the pre-inverted write clock PWCKB may toggle at a voltage level between the source voltage (VDD in FIG. 3) and the ground voltage (VSS in FIG. 3).

The write clock generation circuit 430 may include a level driving circuit (LEV DRV) 431 and a transmission circuit (TX) 432.

The level driving circuit 431 may be connected to the third pad 33 and the fourth pad 34. During the pre-level interval, the level driving circuit 431 may drive the third pad 33 in response to the enable signal PREN. During the pre-level interval, the level driving circuit 431 may drive the fourth pad 34 in response to the enable signal PREN. The level driving circuit 431 may be implemented as the same circuit as the level driving circuit 131, illustrated in FIG. 3, and may perform the same operation as the same circuit as the level driving circuit 131, and a detailed description of the level driving circuit 431 has been omitted.

The transmission circuit 432 may be connected to the third pad 33, the fourth pad 34, and the sixth pad 36. During the pre-level interval, the transmission circuit 432 may drive the third pad 33 based on the pre-write clock PWCK, the pre-inverted write clock PWCKB, and first to fourth code signals CODE<1:4> that are input through the sixth pad 36. During the pre-level interval, the transmission circuit 432 may drive the fourth pad 34, based on the pre-write clock PWCK, the pre-inverted write clock PWCKB, and the first to fourth code signals CODE<1:4>. During the toggle interval, the transmission circuit 432 may drive the third pad 33 based on the pre-write clock PWCK, the pre-inverted write clock PWCKB, and the first to fourth code signals CODE<1:4>. During the toggle interval, the transmission circuit 432 may drive the fourth pad 34 based on the pre-write clock PWCK, the pre-inverted write clock PWCKB, and the first to fourth code signals CODE<1:4>. The transmission circuit 432 may be implemented as the same circuit as the transmission circuit 132 illustrated in FIG. 4 and may perform the same operation as the same circuit as the transmission circuit 132, and a detailed description of the transmission circuit 432 has been omitted.

The write clock generation circuit 430 may be connected to the third pad 33, the fourth pad 34, and the sixth pad 36. During the pre-level interval, the write clock generation circuit 430 may output the write clock WCK having the first set level through the third pad 33 based on the enable signal PREN, the pre-write clock PWCK, the pre-inverted write clock PWCKB, and the first to fourth code signals CODE<1:4>. During the pre-level interval, the write clock generation circuit 430 may output the inverted write clock WCKB having the second set level through the fourth pad 44 based on the enable signal PREN, the pre-write clock PWCK, the pre-inverted write clock PWCKB, and the first to fourth code signals CODE<1:4>. During the toggle interval, the write clock generation circuit 430 may output the write clock WCK that periodically toggles through the third pad 33 based on the pre-write clock PWCK, the pre-inverted write clock PWCKB, and the first to fourth code signals CODE<1:4>. During the toggle interval The write clock generation circuit 430 may output the inverted write clock WCKB that periodically toggles through the fourth pad 34 based on the pre-write clock PWCK, the pre-inverted write clock PWCKB, and the first to fourth code signals CODE<1:4>.

The data generation circuit 440 may be connected to the fifth pad 35. The data generation circuit 440 may output first to N-th data DATA<1:N> for performing a write operation through the fifth pad 35. The first to N-th data DATA<1:N> may include "N" bits. The number "N" of bits of the first to N-th data DATA<1:N> may be set as a positive integer.

Figure 9:
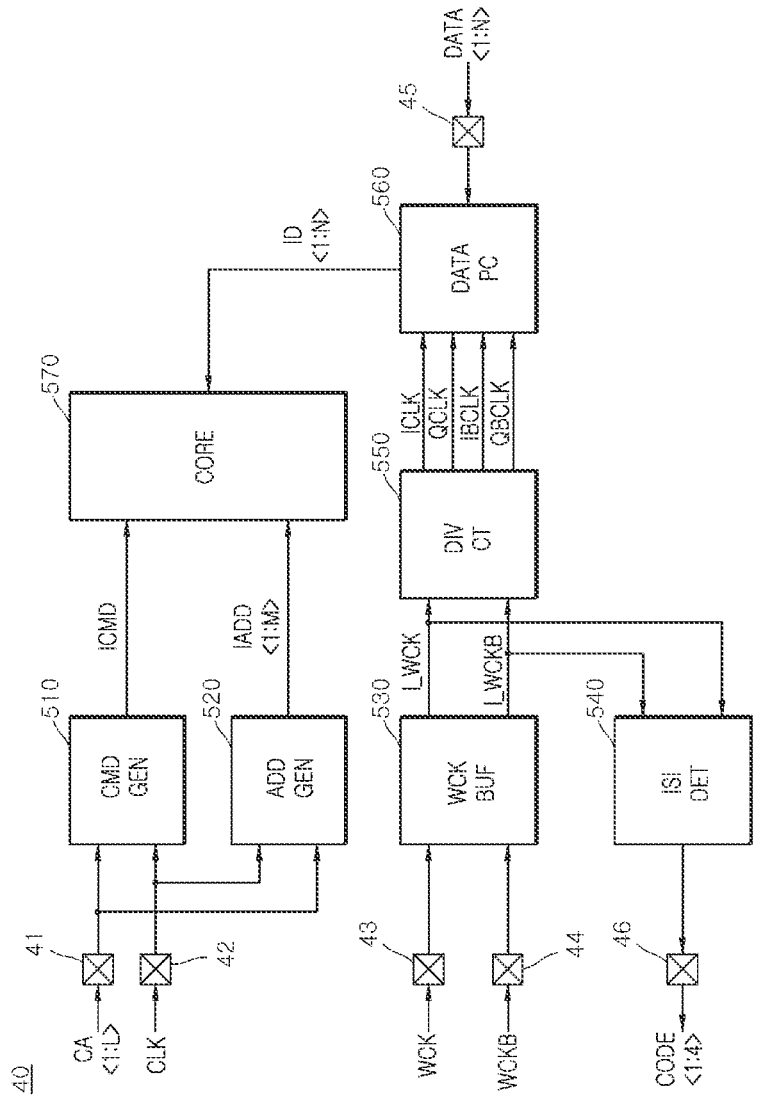
FIG. 9 is a block diagram illustrating a construction according to an embodiment of a semiconductor device that is included in the semiconductor system illustrated in FIG. 7.

FIG. 9 is a block diagram illustrating a construction according to an embodiment of the semiconductor device 40 that is included in the semiconductor system 2. The semiconductor device 40 may include a command generation circuit (CMD GEN) 510, an address generation circuit (ADD GEN) 520, a write clock buffer circuit (WCK BUF) 530, a detection circuit (ISI DET) 540, a frequency division circuit (DIV CT) 550, a data processing circuit (DATA PC) 560, and a core circuit (CORE) 570.

The command generation circuit 510 may be connected to the seventh pad 41 and the eighth pad 42. The command generation circuit 510 may generate an internal command ICMD based on first to L-th command addresses CA<1:L> that are input through the seventh pad 41 in synchronization with the clock CLK that is input through the eighth pad 42. The command generation circuit 510 may generate the internal command ICMD when the first to L-th command addresses CA<1:L> that are input in synchronization with the clock CLK have a logic level combination for performing a write operation. The command generation circuit 510 has been implemented to generate the internal command ICMD for performing a write operation but may be implemented to generate multiple internal commands for performing various operations according to embodiments.

The address generation circuit 520 may be connected to the seventh pad 41 and the eighth pad 42. The address generation circuit 520 may generate first to M-th internal addresses IADD<1:M> based on the first to L-th command addresses CA<1:L> that are input through the seventh pad 41 in synchronization with the clock CLK that is input through the eighth pad 42. The address generation circuit 520 may generate the first to M-th internal addresses IADD<1:M> that are selectively enabled by decoding the first to L-th command addresses CA<1:L> that are input in synchronization with the clock CLK. The first to M-th internal addresses IADD<1:M> may include "M" bits. The number "M" may be set as a positive integer.

The write clock buffer circuit 530 may be connected to the ninth pad 43 and the tenth pad 44. During the toggle interval, the write clock buffer circuit 530 may generate an input write clock I_WCK by buffering the write clock WCK that is input through the ninth pad 43. During the toggle interval, the write clock buffer circuit 530 may generate an inverted input write clock I_WCKB by buffering the inverted write clock WCKB that is input through the tenth pad 44.

The detection circuit 540 may be connected to the twelfth pad 46. The detection circuit 540 may generate first to fourth code signals CODE<1:4> by detecting the number of toggles of each of the input write clock I_WCK and the inverted input write clock I_WCKB that have occurred during the toggle interval. The detection circuit 540 may generate the first to fourth code signals CODE<1:4> including information with regard to the characteristics of the channel CH2 by detecting the number of toggles of each of the input write clock I_WCK and the inverted input write clock I_WCKB. The detection circuit 540 may output the first to fourth code signals CODE<1:4> through the twelfth pad 46. The detection circuit 540 has been implemented to generate the first to fourth code signals CODE<1:4> by detecting the number of toggles of each of the input write clock I_WCK and the inverted input write clock I_WCKB that have occurred during the toggle interval but may be implemented to generate the first to fourth code signals CODE<1:4> through various methods according to embodiments.

The frequency division circuit 550 may generate a first internal clock ICLK, a second internal clock QCLK, a third internal clock IBCLK, and a fourth internal clock QBCLK by dividing the frequencies of the input write clock I_WCK and the inverted input write clock I_WCKB. The frequency division circuit 550 may generate the first internal clock ICLK, the second internal clock QCLK, the third internal clock IBCLK, and the fourth internal clock QBCLK, each having a frequency that is ½ (half) the frequency of each of the input write clock I_WCK and the inverted input write clock I_WCKB and that are sequentially generated. The first internal clock ICLK, the second internal clock QCLK, the third internal clock IBCLK, and the fourth internal clock QBCLK may be generated to have different phases.

The data processing circuit 560 may be connected to the eleventh pad 45. The data processing circuit 560 may generate first to N-th internal data ID<1:N> based on first to N-th data DATA<1:N> that are input through the eleventh pad 45 in synchronization with the first internal clock ICLK, the second internal clock QCLK, the third internal clock IBCLK, and the fourth internal clock QBCLK. The data processing circuit 560 may generate, in parallel, the first to N-th internal data ID<1:N> by latching and arranging the bits of the first to N-th data DATA<1:N> that are input in series in synchronization with the first internal clock ICLK, the second internal clock QCLK, the third internal clock IBCLK, and the fourth internal clock QBCLK. For example, the data processing circuit 560 may latch the first data DATA<1> that is input at a rising edge of the first internal clock ICLK, latch the second data DATA<2> that is input at a rising edge of the second internal clock QCLK, latch the third data DATA<3> that is input at a rising edge of the third internal clock IBCLK, and latch the fourth data DATA<4> that is input at a rising edge of the fourth internal clock QBCLK. The data processing circuit 360 may generate, in parallel, the first to fourth internal data ID<1:4> at the same time by arranging the first to fourth data DATA<1:4> that have been latched.

The core circuit 570 may be implemented as a common memory circuit including multiple memory cells (not illustrated). The core circuit 570 may store the first to N-th internal data ID<1:N> in a memory cell (not illustrated) that is selected among multiple memory cells (not illustrated) based on the internal command ICMD and the first to M-th internal addresses IADD<1:M>. The core circuit 570 has been implemented to perform a write operation but may be implemented to an active operation, a read operation, a precharge operation, and a refresh operation according to embodiments.

Figure 10:
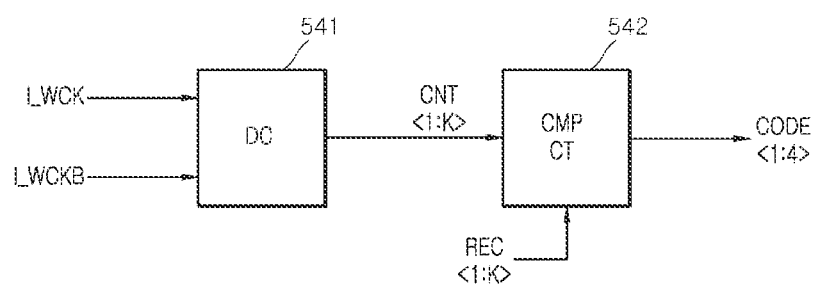
FIG. 10 is a block diagram illustrating a construction according to an embodiment of a detection circuit that is included in the semiconductor device illustrated in FIG. 9.

FIG. 10 is a block diagram illustrating a construction according to an embodiment of the detection circuit 540 that is included in the semiconductor device 40. The detection circuit 540 may include a counter (DC) 541 and a comparison circuit (CMP CT) 542.

The counter 541 may generate first to K-th counting signals CNT<1:K> based on the number of toggles of each of the input write clock I_WCK and the inverted input write clock I_WCKB. The counter 541 may generate the first to K-th counting signals CNT<1:K> that are sequentially counted whenever the input write clock I_WCK and the inverted input write clock I_WCKB toggle. The first to K-th counting signals CNT<1:K> may include "K" bits. The number "K" may be set as a positive integer.

The comparison circuit 542 may generate the first to fourth code signals CODE<1:4> based on first to K-th reference counting signals REC<1:K> and the first to K-th counting signals CNT<1:K>. The comparison circuit 542 may up-count the first to fourth code signals CODE<1:4> when the number of first to K-th counting signals CNT<1:K> counted is less than the number of first to K-th reference counting signals REC<1:K> counted. The comparison circuit 542 may down-count the first to fourth code signals CODE<1:4> when the number of first to K-th counting signals CNT<1:K> counted is equal to or greater than the number of first to K-th reference counting signals REC<1:K> counted. The first to K-th reference counting signals REC<1:K> may each be set as a signal including reference information with regard to a preset PVT variation and preset transmission speed of the channel CH2. The first to K-th reference counting signals REC<1:K> may be set as a signal that is stored in a mode register set (MRS) that is included in the semiconductor device 40. The first to K-th reference counting signals REC<1:K> may include "K" bits. The number "K" may be set as a positive integer.

Figure 11:
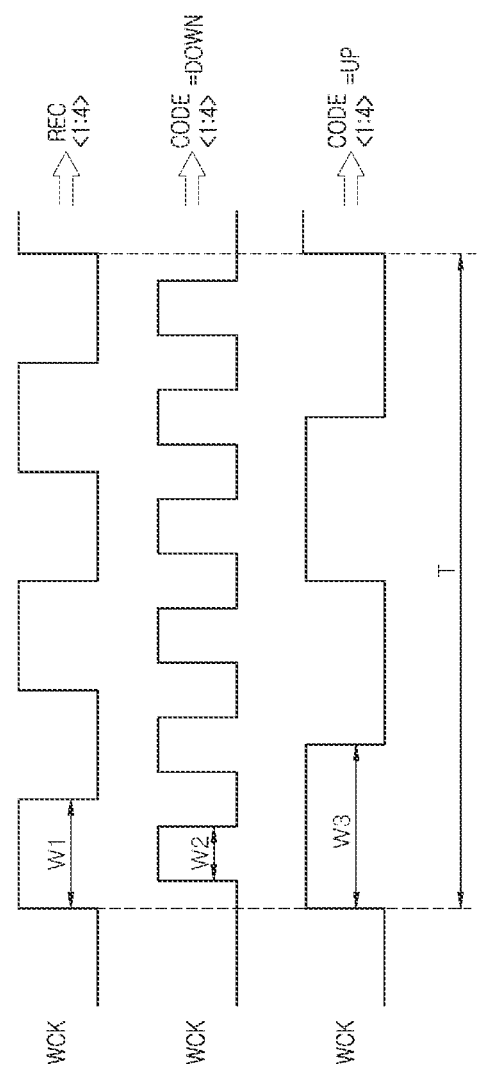
FIG. 11 is a diagram for describing an operation of a detection circuit illustrated in FIG. 10.

An operation of the detection circuit 540 according to another embodiment of the present disclosure is described with reference to FIG. 11. In this case, an operation of generating the first to fourth code signals CODE<1:4> by detecting the number of toggles of the write clock WCK during the toggle interval is described as follows.

Prior to the description of generating the first to fourth code signals CODE<1:4>, a case in which the write clock WCK that is generated by the first to K-th reference counting signals REC<1:K> including reference information with regard to a preset PVT variation and preset transmission speed of the channel CH2 has a first pulse width W1 is described as follows as an example. In this case, the write clock WCK toggles six times during a set time T.

First, a case in which the write clock WCK having a second pulse width W2 is generated is described as follows.

When the write clock WCK having the second pulse width W2 is generated, the write clock WCK may toggle twelve times during the set time T. The detection circuit 540 may down-count the first to fourth code signals CODE<1:4> by detecting the number of toggles of the write clock WCK twelve times. The detection circuit 540 may down-count the first to fourth code signals CODE<1:4> until the clock WCK toggles six times.

The pulse width of the write clock WCK may be gradually increased because the driving power for driving the write clock WCK becomes small whenever the first to fourth code signals CODE<1:4> are down-counted.

Next, a case in which the write clock WCK having a third pulse width W3 is generated is described as follows.

When the write clock WCK having the third pulse width W3 is generated, the write clock WCK may toggle four times during the set time T. The detection circuit 540 may up-count the first to fourth code signals CODE<1:4> by detecting the number of toggles of the write clock WCK four times. The detection circuit 540 may up-count the first to fourth code signals CODE<1:4> until the clock WCK toggles six times.

The pulse width of the write clock WCK is gradually decreased because the driving power for driving the write clock WCK becomes great whenever the first to fourth code signals CODE<1:4> are up-counted.

The semiconductor system 2 (FIG. 7), according to another embodiment of the present disclosure, can decrease the ISI of a channel and stably generate the write clock WCK and the inverted write clock WCKB by generating the write clock WCK and the inverted write clock WCKB, each having a set level based on information with regard to the characteristics of the channel during the pre-level interval and then generating the write clock WCK and the inverted write clock WCKB that periodically toggle during the toggle interval. The semiconductor system 2 can perform a stable data input and output operation by inputting and outputting the data DATA in synchronization with the write clock WCK and the inverted write clock WCKB that stably toggle after performing the pre-level adjustment operation (Pre-Level) (FIG. 6).

Figure 12:
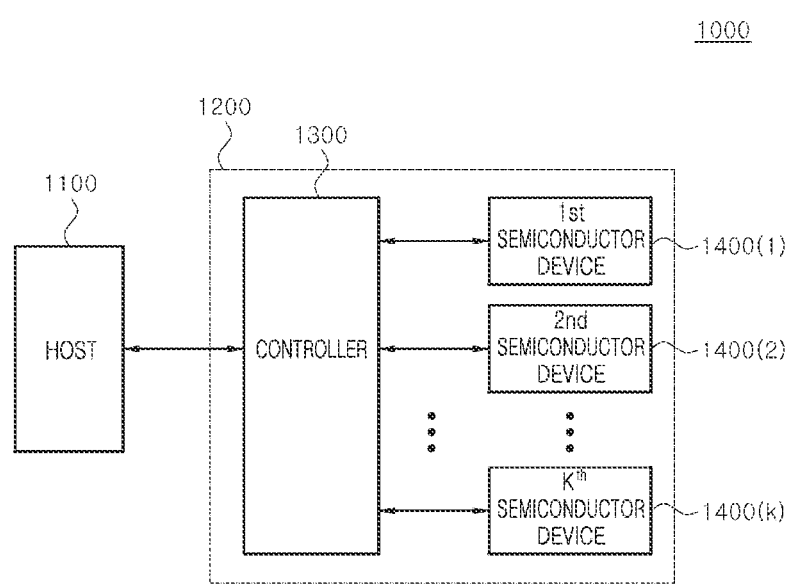
FIG. 12 is a diagram illustrating a construction according to an embodiment of an electronic system to which the semiconductor system illustrated in FIGS. 1 to 11 has been applied.

FIG. 12 is a block diagram illustrating a construction according to an embodiment of an electronic system 1000 according to an embodiment of the present disclosure. As illustrated in FIG. 12, the electronic system 1000 may include a host 1100 and a semiconductor system 1200.

The host 1100 and the semiconductor system 1200 may mutually transmit signals by using an interface protocol. The interface protocol that is used between the host 1100 and the semiconductor system 1200 may include a multi-media card (MMC), an enhanced small disk interface (ESDI), integrated drive electronics (IDE), peripheral component interconnect-express (PCI-E), advanced technology attachment (ATA), serial ATA (SATA), parallel ATA (PATA), a serial attached SCSI (SAS), and a universal serial bus (USB).

The semiconductor system 1200 may include a controller 1300 and semiconductor devices 1400(1:K). The controller 1300 may control the semiconductor devices 1400(1:K) so that the semiconductor devices 1400(1:K) perform a write operation. The controller 1300 may generate the write clock WCK and the inverted write clock WCKB, each having a set level based on information with regard to the characteristics of a channel during the pre-level interval and may then generate the write clock WCK and the inverted write clock WCKB that periodically toggle during the toggle interval. Each of the semiconductor devices 1400(1:K) may latch the data DATA in synchronization with the write clock WCK and the inverted write clock WCKB and may arrange and store the latched data DATA.

The controller 1300 may be implemented as the controller 10, illustrated in FIG. 1, or the controller 30, illustrated in FIG. 7. Each of the semiconductor devices 140(1:K) may be implemented as the semiconductor device 20, illustrated in FIG. 1, or the semiconductor device 40, illustrated in FIG. 7. Each of the semiconductor devices 20 and 40 may be implemented as one of dynamic random access memory (DRAM), phase change random access memory (PRAM), resistive random access memory (RRAM), magnetic random access memory (MRAM), and ferroelectric random access memory (FRAM).

The semiconductor system 1200 can decrease the ISI of a channel and stably generate the write clock WCK and the inverted write clock WCKB by generating the write clock WCK and the inverted write clock WCKB, each having a set level based on information with regard to the characteristics of the channel during the pre-level interval and then generating the write clock WCK and the inverted write clock WCKB that periodically toggle during the toggle interval. The semiconductor system 1200 can perform a stable data input and output operation by inputting and outputting the data DATA in synchronization with the write clock WCK and the inverted write clock WCKB that stably toggle after performing the pre-level adjustment operation (Pre-Level).

What is claimed is:

1. A semiconductor system comprising:
    a controller configured to output a command address, data, and a write clock and an inverted write clock for latching the data through a channel, configured to output the write clock and the inverted write clock having a first set level and a second set level, respectively, by incorporating information with regard to characteristics of the channel during a pre-level interval, and configured to output the write clock and the inverted write clock that periodically toggle during a toggle interval; and
    a semiconductor device configured to latch and store the data in synchronization with the write clock and the inverted write clock during the toggle interval, wherein, the first set level is a voltage level higher than the voltage level of a ground voltage and the second set level is a voltage level lower than the voltage level of a source voltage.

2. The semiconductor system of claim 1, wherein the controller is configured to output the write clock having the first set level and the inverted write clock having the second set level during the pre-level interval in response to a code signal into which the information with regard to the characteristics of the channel has been incorporated.

3. The semiconductor system of claim 2,
wherein the channel comprises multiple pads and multiple transmission lines, and
wherein the information with regard to the characteristics of the channel comprises a process, voltage, and temperature (PVT) variation and transmission speed for the multiple pads and the multiple transmission lines.

4. The semiconductor system of claim 1, wherein the controller is configured to output the write clock having a voltage level of the ground voltage and the inverted write clock having a voltage level of the source voltage when the data is not output.

5. The semiconductor system of claim 1, wherein the controller comprises:
an operation control circuit configured to output the command address for controlling an operation of the semiconductor device through the channel;
a write clock control circuit configured to generate an enable signal that is generated during the pre-level interval and configured to generate a pre-write clock, a pre-inverted write clock, and a code signal during the pre-level interval and the toggle interval;
a write clock generation circuit configured to output the write clock having the first set level and the inverted write clock having the second set level through the channel in response to the enable signal and the code signal during the pre-level interval and configured to output the write clock and the inverted write clock that periodically toggle based on the pre-write clock, the pre-inverted write clock, and the code signal through the channel during the toggle interval; and
a data generation circuit configured to output the data through the channel.

6. The semiconductor system of claim 5, wherein the write clock control circuit is configured to generate the pre-write clock having a voltage level of the ground voltage and the pre-inverted write clock having a voltage level of the source voltage during the pre-level interval and configured to output the pre-write clock and the pre-inverted write clock that periodically toggle during the toggle interval.

7. The semiconductor system of claim 5, wherein the write clock generation circuit comprises:
a level driving circuit connected to a first pad from which the write clock is output and a second pad from which the inverted write clock is output and configured to drive the first pad and the second pad when the enable signal is enabled; and
a transmission circuit connected to the first pad and the second pad and configured to generate the write clock and the inverted write clock by driving the first pad and the second pad based on the pre-write clock, the pre-inverted write clock, and the code signal.

8. The semiconductor system of claim 7, wherein the level driving circuit comprises:

a first driving circuit configured to drive the first pad with a first pull-up driving power by receiving charges from the source voltage when the enable signal is enabled; and
a second driving circuit configured to drive the second pad with a first pull-down driving power by discharging charges of the second pad to the ground voltage when the enable signal is enabled.

9. The semiconductor system of claim 8, wherein the transmission circuit comprises:
a write clock driving circuit configured to generate the write clock by driving the first pad with a second pull-down driving power based on a logic level combination of the pre-write clock and the inverted pre-write clock during the pre-level interval, wherein the second pull-down driving power is set based on a logic level combination of the code signal; and
an inverted write clock driving circuit configured to generate the inverted write clock by driving the second pad with a second pull-up driving power based on a logic level combination of the pre-write clock and the inverted pre-write clock during the pre-level interval, wherein the second pull-up driving power is set based on a logic level combination of the code signal.

10. The semiconductor system of claim 9,
wherein the write clock is generated to have the first set level as the first pad is driven by the first pull-up driving power and the second pull-down driving power during the pre-level interval, and
wherein the inverted write clock is generated to have the second set level as the second pad is driven by the first pull-down driving power and the second pull-up driving power during the pre-level interval.

11. The semiconductor system of claim 9,
wherein the write clock driving circuit generates the write clock that toggles by driving the first pad based on the logic level combination of the code signal and the logic level combination of the pre-write clock and the inverted pre-write clock during the toggle interval, and
wherein the inverted write clock driving circuit generates the inverted write clock that toggles by driving the second pad based on the logic level combination of the code signal and the logic level combination of the pre-write clock and the inverted pre-write clock during the toggle interval.

12. A semiconductor system comprising:
a controller configured to output a command address, data, and a write clock and an inverted write clock for latching the data through a channel, configured to output the write clock having a first set level and the inverted write clock having a second set level in response to a code signal that is input through the channel during a pre-level interval, and configured to output the write clock and the inverted write clock that periodically toggle during a toggle interval; and
a semiconductor device configured to output the code signal by detecting the write clock and the inverted write clock that are input during the toggle interval and configured to latch and store the data in synchronization with the write clock and the inverted write clock,
wherein, the first set level is a voltage level higher than the voltage level of a ground voltage and the second set level is a voltage level lower than the voltage level of a source voltage.

13. The semiconductor system of claim 12, wherein the semiconductor device is configured to generate the code signal comprising information with regard to characteristics of the channel by detecting a number of toggles of each of the write clock and the inverted write clock that are input through the channel during the toggle interval.

14. The semiconductor system of claim 13,
wherein the channel comprises multiple pads and multiple transmission lines, and
wherein the information with regard to the characteristics of the channel comprises a process, voltage, and temperature (PVT) variation and transmission speed for the multiple pads and the multiple transmission lines.

15. The semiconductor system of claim 12, wherein the controller comprises:
an operation control circuit configured to output the command address for controlling an operation of the semiconductor device through the channel;
a write clock control circuit configured to generate an enable signal that is generated during the pre-level interval and configured to generate a pre-write clock and a pre-inverted write clock during the pre-level interval and the toggle interval;
a write clock generation circuit configured to output the write clock having the first set level and the inverted write clock having the second set level through the channel in response to the enable signal and the code signal during the pre-level interval and configured to output the write clock and the inverted write clock that periodically toggle based on the pre-write clock, the pre-inverted write clock, and the code signal through the channel during the toggle interval; and
a data generation circuit configured to output the data through the channel.

16. The semiconductor system of claim 15, wherein the write clock control circuit is configured to generate the pre-write clock having a voltage level of the ground voltage and the pre-inverted write clock having a voltage level of the source voltage during the pre-level interval and configured to output the pre-write clock and the pre-inverted write clock that periodically toggle during the toggle interval.

17. The semiconductor system of claim 15, wherein the write clock generation circuit comprises:
a level driving circuit connected to a first pad from which the write clock is output and a second pad from which the inverted write clock is output and configured to drive the first pad and the second pad when the enable signal is enabled; and
a transmission circuit connected to the first pad and the second pad and configured to generate the write clock and the inverted write clock by driving the first pad and the second pad based on the pre-write clock, the pre-inverted write clock, and the code signal.

18. The semiconductor system of claim 17, wherein the level driving circuit comprises:
a first driving circuit configured to drive the first pad with a first pull-up driving power by receiving charges from the source voltage when the enable signal is enabled; and
a second driving circuit configured to drive the second pad with a first pull-down driving power by discharging charges of the second pad to the ground voltage when the enable signal is enabled.

19. The semiconductor system of claim 18, wherein the transmission circuit comprises:
a write clock driving circuit configured to generate the write clock by driving the first pad with a second pull-down driving power based on a logic level combination of the pre-write clock and the inverted pre-write clock during the pre-level interval, wherein the second pull-down driving power is set based on a logic level combination of the code signal; and
an inverted write clock driving circuit configured to generate the inverted write clock by driving the second pad with a second pull-up driving power based on a logic level combination of the pre-write clock and the inverted pre-write clock during the pre-level interval, wherein the second pull-up driving power is set based on a logic level combination of the code signal.

20. The semiconductor system of claim 19,
wherein the write clock having the first set level is generated as the first pad is driven by the first pull-up driving power and the second pull-down driving power during the pre-level interval, and
wherein the inverted write clock having the second set level is generated as the second pad is driven by the first pull-down driving power and the second pull-up driving power during the pre-level interval.

21. The semiconductor system of claim 19,
wherein the write clock driving circuit generates the write clock that toggles by driving the first pad based on the logic level combination of the code signal and the logic level combination of the pre-write clock and the inverted pre-write clock during the toggle interval, and
wherein the inverted write clock driving circuit generates the inverted write clock that toggles by driving the second pad based on the logic level combination of the code signal and the logic level combination of the pre-write clock and the inverted pre-write clock during the toggle interval.

22. The semiconductor system of claim 12, wherein the semiconductor device comprises:
a write clock buffer circuit configured to generate an input write clock and an inverted input write clock by buffering the write clock and the inverted write clock that are input during the toggle interval;
a detection circuit configured to generate the code signal by detecting a number of toggles of each of the input write clock and the inverted input write clock during the toggle interval;
a frequency division circuit configured to generate first to fourth internal clocks by dividing frequencies of the input write clock and the inverted input write clock;
a data processing circuit configured to generate internal data by latching the data in synchronization with the first to fourth internal clocks; and
a core circuit configured to store the internal data at a location that is selected by an internal command and internal address that are generated from the command address.

23. The semiconductor system of claim 22, wherein the detection circuit comprises:
a counter configured to generate counting signals that are sequentially counted whenever the input write clock and the inverted input write clock toggle; and
a comparison circuit configured to generate the code signal by comparing a reference counting signal with the counting signal.

24. The semiconductor system of claim 23, wherein the comparison circuit up-counts the counting signal when a number of counting signals counted is less than a number of reference counting signals counted and down-counts the counting signal when the number of counting signals counted is equal to or greater than the number of reference counting signals counted.

* * * * *